United States Patent
Miyazaki et al.

(10) Patent No.: US 9,965,167 B2
(45) Date of Patent: May 8, 2018

(54) DISPLAY APPARATUS FOR DISPLAYING IMAGES IN DIFFERENT MANNERSAND NON-TRANSITORY STORAGE MEDIUM STORING INSTRUCTIONS EXECUTABLE BY THE DISPLAY APPARATUS

(71) Applicants: Sadaaki Miyazaki, Nagoya (JP); Dai Kadota, Nagoya (JP); Yuki Takahashi, Nagoya (JP)

(72) Inventors: Sadaaki Miyazaki, Nagoya (JP); Dai Kadota, Nagoya (JP); Yuki Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 412 days.

(21) Appl. No.: 14/176,534

(22) Filed: Feb. 10, 2014

(65) Prior Publication Data
US 2014/0237428 A1 Aug. 21, 2014

(30) Foreign Application Priority Data
Feb. 19, 2013 (JP) ................. 2013-030011

(51) Int. Cl.
| G06F 3/048 | (2013.01) |
| G06F 3/0488 | (2013.01) |
| G03G 15/00 | (2006.01) |
| G06F 3/0485 | (2013.01) |

(52) U.S. Cl.
CPC ......... *G06F 3/0488* (2013.01); *G03G 15/502* (2013.01); *G03G 15/5016* (2013.01); *G06F 3/0485* (2013.01)

(58) Field of Classification Search
CPC .... G06F 3/0481; G06F 3/0488; G06F 3/0484; G03G 15/5016; G03G 15/502
See application file for complete search history.

(56) References Cited

U.S. PATENT DOCUMENTS

| 2009/0160804 A1* | 6/2009 | Chang ................. G06F 3/03547 345/173 |
| 2011/0222122 A1* | 9/2011 | Murakami ............ G06F 3/1205 358/1.18 |

(Continued)

FOREIGN PATENT DOCUMENTS

JP 2012-079065 A 4/2012

*Primary Examiner* — Haoshian Shih
*Assistant Examiner* — Asteway T Gattew
(74) *Attorney, Agent, or Firm* — Scully, Scott, Murphy & Presser, PC (57) ABSTRACT

A display apparatus includes: a display device; a touch panel for sensing movement of an input object; a storage storing data representating images; and a controller. Images are displayed on the display device so as to be arranged in an arrangement order. The controller calculates a moving amount for moving the images, in response to movement of the input object. When the images are movable by the calculated moving amount in a moving direction commanded, the controller moves the images displayed on the display device, by the calculated moving amount in the moving direction. When the images are not movable in the moving direction by the calculated moving amount, the controller changes a display manner of the images and display the images in the changed display manner.

18 Claims, 4 Drawing Sheets

(56) References Cited

U.S. PATENT DOCUMENTS

| | | | |
|---|---|---|---|
| 2012/0066627 A1* | 3/2012 | Furukawa | G06F 3/0488 715/768 |
| 2012/0084730 A1 | 4/2012 | Noma et al. | |
| 2012/0242602 A1* | 9/2012 | Choi | G06F 3/0482 345/173 |
| 2012/0272181 A1* | 10/2012 | Rogers | G06F 3/0482 715/784 |
| 2013/0106737 A1* | 5/2013 | Hong | G06F 3/0485 345/173 |

* cited by examiner

DISPLAY APPARATUS FOR DISPLAYING IMAGES IN DIFFERENT MANNERSAND NON-TRANSITORY STORAGE MEDIUM STORING INSTRUCTIONS EXECUTABLE BY THE DISPLAY APPARATUS

CROSS REFERENCE TO RELATED APPLICATION

The present application claims priority from Japanese Patent Application No. 2013-030011, which was filed on Feb. 19, 2013, the disclosure of which is herein incorporated by reference in its entirety.

BACKGROUND OF THE INVENTION

Field of the Invention

The present invention relates to a display apparatus and a non-transitory storage medium storing instructions executable by the display apparatus.

Description of the Related Art

There is known an information device equipped with a touch panel on which icons arranged in a row can be scrolled in a direction in which an input object is slid in a lateral direction in a state in which the input object is located on one of the icons displayed on a display screen of the touch panel. In such an information device, if a rightmost icon or a leftmost icon of the icons arranged in a row is located on a right end portion or a left end portion of the display screen, the icon cannot be scrolled further in a right direction or a left direction.

SUMMARY OF THE INVENTION

There is a case where the icons are not scrolled due to other reasons such as a failure of a sliding operation. Thus, in the above-described technique of scrolling icons, if the icons are not scrolled though the sliding operation is performed, the user cannot recognize whether this situation is caused by the rightmost or leftmost icon being located on the end portion of the display screen or by other reasons such as the failure of the sliding operation, resulting in poor operability of a user interface.

This invention has been developed to provide: a display apparatus capable of improving operability of a user interface on which images arranged in a predetermined direction can be scrolled; and a non-transitory storage medium storing instructions executable by the display apparatus.

The present invention provides a display apparatus comprising: a display device; a touch panel superposed on the display device and configured to detect a touch operation of an input object in a state in which the touch panel is touched or approached by the input object; a storage configured to store a plurality of sets of data respectively representative of a plurality of images; and a controller configured to: control the display device to display at least two images of the plurality of images in a state in which the at least two images are arranged in a first direction in an arrangement order; calculate a moving amount based on a moving operation when the moving operation is received by the touch panel, the moving operation being an operation for moving the at least two images in one of a first direction and a second direction opposed to the first direction; move the at least two images arranged in the arrangement order and displayed on the display device, by the calculated moving amount in the moving direction, when the at least two images arranged in the arrangement order are movable by the calculated moving amount in a moving direction indicated by the moving operation; and change a display manner of the at least two images arranged in the arrangement order and display the at least two images arranged in the arrangement order in the changed display manner, when the at least one image at least two images arranged in the arrangement order are not movable in the moving direction by the calculated moving amount.

The present invention also provides a non-transitory storage medium storing instructions executable by a computer of a display apparatus, the display apparatus comprising: a display device; and a touch panel superposed on the display device and configured to detect a touch operation of an input object in a state in which the touch panel is touched or approached by the input object, the instructions, when executed, causing the computer to: control the display device to display at least two images of a plurality of images respectively based on a plurality of sets of data stored in a storage, in a state in which the at least two images are arranged in a first direction in an arrangement order; calculate a moving amount based on a moving operation when the moving operation is received by the touch panel, the moving operation being an operation for moving the at least two images in one of the first direction and a second direction opposed to the first direction; move the at least two images arranged in the arrangement order and displayed on the display device, by the calculated moving amount in the moving direction, when the at least two images arranged in the arrangement order are movable by the calculated moving amount in a moving direction indicated by the moving operation; and change a display manner of the at least two images arranged in the arrangement order and display the at least two images arranged in the arrangement order in the changed display manner, when the at least one image at least two images arranged in the arrangement order are not movable in the moving direction by the calculated moving amount.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Figure 1:
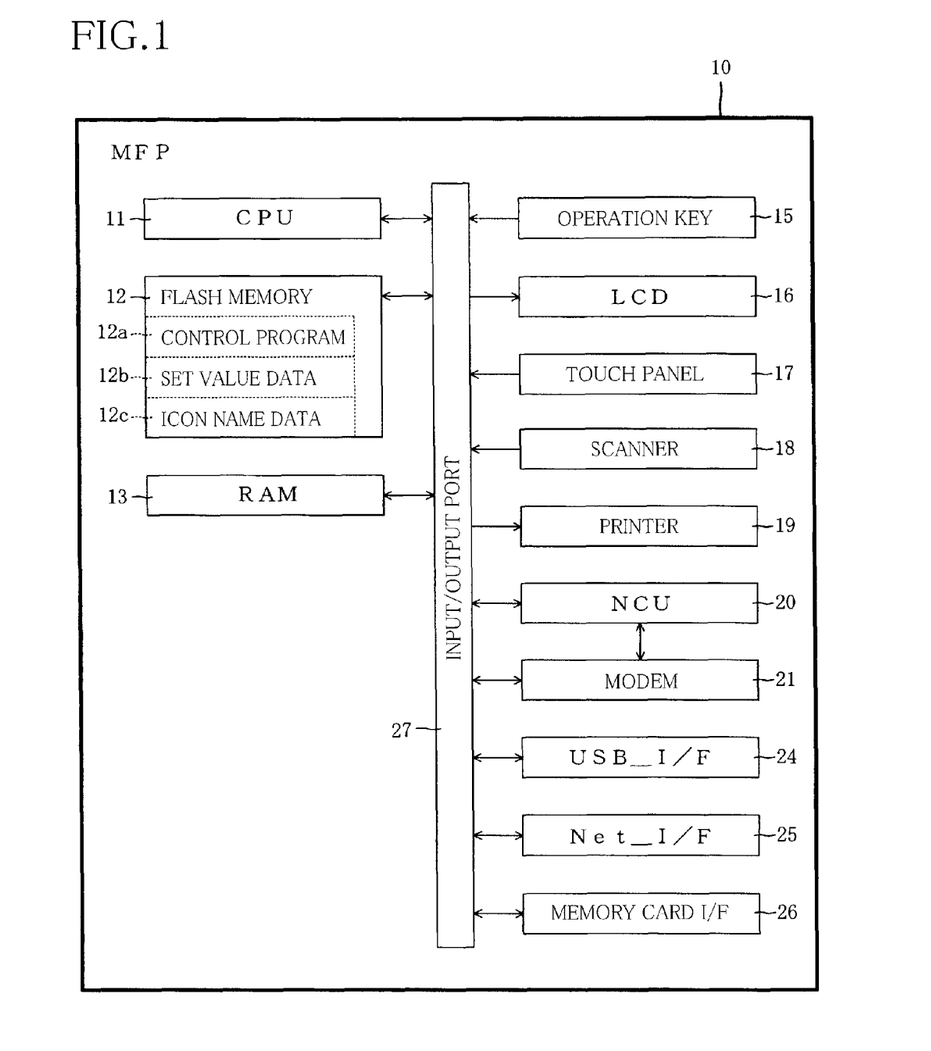
FIG. 1 is a block diagram illustrating an electric configuration of a multi-function peripheral.

Hereinafter, there will be described one embodiment of the present invention by reference to the drawings. FIG. 1 illustrates an electric configuration of a multi-function peripheral (MFP) 10 as one embodiment of a display apparatus according to the present invention. The MFP 10 has various functions such as a copying function, a printing function, a scanning function, and a facsimile function. In the present embodiment, the MFP 10 offers good operability of a setting screen which is a user interface for setting each function.

The MFP 10 mainly includes a CPU 11, a flash memory 12, a RAM 13, operation keys 15, an LCD 16, a touch panel 17, a scanner 18, a printer 19, an NCU 20, a modem 21, a USB interface (USB I/F) 24, a network interface (network I/F) 25, and a memory card interface (memory card I/F) 26. The devices 11-13, 15-21, and 24-26 are connected to each other via an input/output port 27.

The CPU 11 controls the functions of the MFP 10 and the devices connected to the input/output port 27, according to fixed values and programs stored in the flash memory 12, data stored in the RAM 13, or various signals transferred via the NCU 20. The flash memory 12 is a non-transitory memory which stores, e.g., a control program 12a for controlling operations of the MFP 10. Processings illustrated in a flow chart in FIG. 4 which will be described below are executed by the CPU 11 according to the control program 12a. The flash memory 12 stores set value data 12b and icon name data 12c. The set value data 12b is data about set values which are set for each function executable by the MFP 10. The icon name data 12c is data representative of the name of one icon corresponding to a combination of the set values. The MFP 10 at shipment stores predetermined values as initial values for the set value data 12b and the icon name data 12c. The values of the set value data 12b and the icon name data 12c can be changed or added by a user as needed. The RAM 13 is a rewritable transitory memory which has a temporary area for temporarily storing data when the CPU 11 executes the control program 12a.

The operation keys 15 are mechanical keys for receiving or accepting input of, e.g., various set values and instructions from a user. The LCD 16 displays various screens thereon. The touch panel 17 is superposed on a screen of the LCD 16. When an input object such as a user's finger or a stylus has touched or approached the screen of the LCD 16, the touch panel 17 detects a position of the input object and transmits the detected position to the CPU 11. The scanner 18 reads a document and converts it to image data. The printer 19 prints an image on a recording sheet based on image data. The modem 21 upon facsimile transmission converts image data to be transmitted, into a signal transmittable to a telephone line network, not shown, and transmits the signal to the telephone line network via the NCU 20. Also, the modem 21 receives a signal from the telephone line network via the NCU 20 to decode the signal into image data. The NCU 20 connects between the MFP 10 and the telephone line network, not shown, and closes or disconnects the line according to a command transmitted from the modem 21 to control connection between the MFP 10 and the telephone line network.

The USB I/F 24 is a well-known device for communicably connecting, via a USB plug, between the MFP 10 and an external device such as a personal computer (PC) and a storage medium including a USB memory. The network I/F 25 is an interface for connecting the MFP 10 to a network, not shown, such as the internet and a LAN. The memory card I/F 26 is an interface on which a rewritable non-transitory memory card, not shown, can be mounted and which controls writing or reading of data into or from the memory card.

There will be next explained, with reference to FIGS. 2A-D and 3A-3C, a setting screen provided for the user to perform settings for each function executable by the MFP 10. FIGS. 2A-2D illustrate one example of a setting screen 50 for setting set values for the purpose of each function. The setting screen 50 illustrated in FIGS. 2A-2D is one of setting screens displayable by the MFP 10, namely, a copy setting screen 50a for setting set values according to a purpose of using the copying function. The copy setting screen 50a contains icons 51 arranged in a right and left direction indicated by arrow L and arrow R. Each of the icons 51 is an image which is displayed for the user to select a combination of the setting values when making a copy. With each icon 51 is associated a corresponding one of combinations of the set values for the purpose of the copy. It is noted that the set values associated with each icon 51 are stored as the set value data 12b.

When the icons 51 are at rest, that is, when the icons 51 are not scrolling, one of the icons 51 arranged in the right and left direction which is located at a designated position provided just below a mark 61 (in a direction indicated by arrow B) is being selected and is in active state. A background to the selected icon 51 is colored to visually distinguish the selected icon 51 from other icons 51 not being selected. In the example in FIG. 2A, an icon 51a is being selected. Just above the selected icon 51 (in a direction indicated by arrow U) is displayed an icon name 71 which is represented by the icon name data 12c associated with the icon 51. The icon name 71 is a name (i.e., a set value) which is associated with each icon 51. In the example in FIG. 2A, the wording "Normal" is displayed just above the icon 51a as the icon name 71.

A display region 72 is provided on an upper right portion of the copy setting screen 50a. At least some of the set values are displayed on the display region 72 among the set values associated with the icon 51 being selected. In the example in FIG. 2A, among the set values associated with the icon 51a being selected, the display region 72 contains: a set value for a sheet type (Plain paper in this example); a set value for a sheet size (A4 in this example); and a set value for a sheet-supply tray, not shown, to be used (Auto Tray Select in this example). On an upper left portion of the copy setting screen 50a is displayed a set value 73 for the number of copies (i.e., the number of printings). The set value 73 for the number of copies is set not only for the icon 51 being selected but also for all the icons 51 displayable on the copy setting screen 50a. The set value 73 can be changed as needed by operating a numeric keypad of the operation keys 15, regardless of which icon 51 is being selected.

When a touch operation on a black-and-white copy button 62 or a color copy button 63 is performed by the user, the MFP 10 makes a black-and-white copy or a color copy using the set values associated with the selected icon 51. The number of copies in this case is the number indicated by the set value 73. For example, when a touch operation for the black-and-white copy button 62 or the color copy button 63 is performed on the copy setting screen 50a illustrated in FIG. 2A, the MFP 10 makes a black-and-white copy or a color copy using the set values associated with the icon 51a being selected. When a touch operation for an option button 64 is performed, the MFP 10 controls the LCD 16 to display, instead of the setting screen 50, a setting screen 80 (see FIGS. 3A-3D) for individually setting the set values associated with the selected icon 51. The user can use the setting screen 80 to individually change the set values associated with the selected icon 51.

Figure 2A:
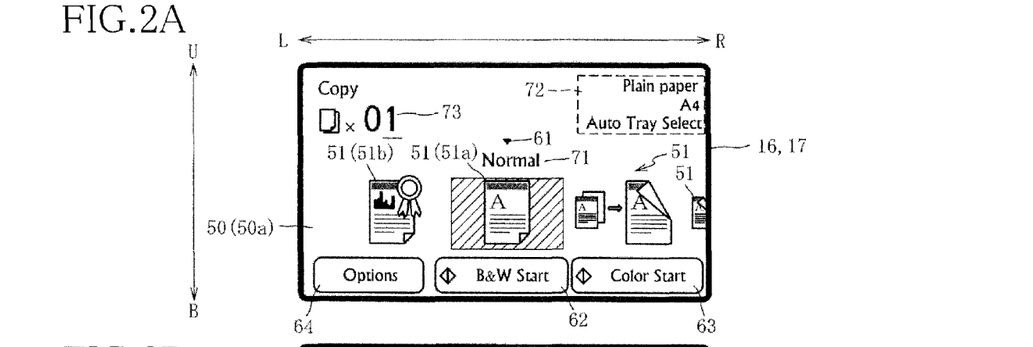
FIGS. 2A-2D are schematic views each illustrating one example of a display manner of a setting screen.

The icons 51 are displayed on the copy setting screen 50a so as to be arranged in a predetermined order (hereinafter may be referred to as "arrangement order"). When the touch panel 17 has detected a drag operation or a flick operation in a direction in which the icons 51 are arranged (i.e., in the left direction or the right direction), the icons 51 arranged in a row in the right and left direction are scrolled in a direction of the drag operation or the flick operation without changing the arrangement order of the icons 51. Accordingly, the user can scroll the icons 51 by the drag operation or the flick operation in the left direction or the right direction to change the icon 51 located just below the mark 61, i.e., the selected icon 51, to an icon 51 desired by the user.

Figure 2B:
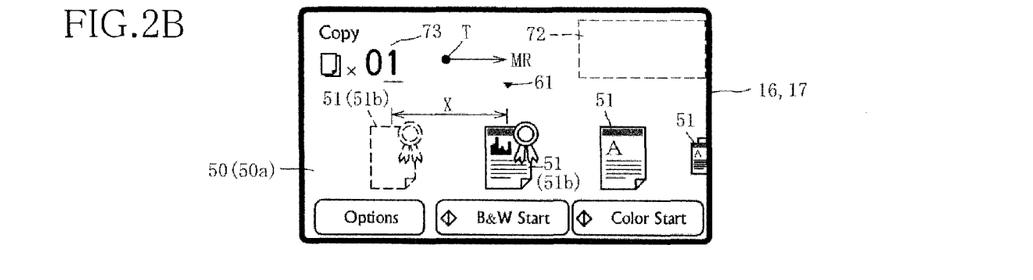

The drag operation is an operation in which the user moves an input object such as his or her finger on or near the touch panel 17 and moves the input object in a direction (hereinafter may be referred to as an operating direction or a moving direction) in the state in which the input object is on or near the touch panel 17. The flick operation is an operation in which the user moves the input object on or near the touch panel 17 and flicks the input object in an operating direction. The drag operation and the flick operation may be hereinafter collectively referred to as "moving operation". For example, as illustrated in FIG. 2B, when the user has performed the moving operation (i.e., the drag operation or the flick operation) in which the user touches a position T of the copy setting screen 50a with his or her finger and moves the finger in the right direction (indicated by arrow MR), the icons 51 arranged in the right and left direction scroll in the right direction (indicated by arrow R).

In a case where the total number of the icons 51 displayable on the copy setting screen 50a is larger than the number of the icons 51 displayable on the LCD 16 in the state in which the icons are arranged in the right and left direction, icons 51 not fitting on the LCD 16 among all the icons 51 are not displayed on the LCD 16. By scrolling the icons 51 displayed and arranged in the right and left direction as needed, one or ones of the icons 51 not being displayed can be displayed on the copy setting screen 50a.

In a case where the icons 51 are scrolled, the MFP 10 does not display the set values on the display region 72 during the scrolling. Likewise, the MFP 10 does not display the icon name 71 during the scrolling of the icons 51. That is, in the present embodiment, in a case where any icon 51 is not located at rest just below the mark 61 (i.e., at the designated position) and is not being selected, the MFP 10 does not display the icon name 71 and the set values to be displayed on the display region 72 among the set values associated with each of the icons 51. Since the set values corresponding to the icons 51 are not displayed during the scrolling for changing the icon 51 to be selected, the user can select a desired icon 51 without being confused by the icon name 71 and the set values displayed on the display region 72. Also, a smaller amount of information is displayed during the scrolling of the icons 51, resulting in improvement in viewability of the copy setting screen 50a during the scrolling of the icons 51. This improves operability of the setting screen 50 (e.g., the copy setting screen 50a) as the user interface.

In contrast, the MFP 10 keeps displaying the set value 73 even when the icons 51 are scrolling. That is, the MFP 10 as the present embodiment continues displaying the set value 73 set for all the icons 51, during the scrolling of the icons 51 regardless of whether a specific icon 51 is being selected or not. Accordingly, the user can always recognize the set value set for all the icons 51, regardless of whether the icons 51 are scrolling or not. Also in this respect, the operability of the setting screen 50 as the user interface is improved.

When the moving operation (i.e., the drag operation or the flick operation) is performed for the touch panel 17, an amount of scrolling or movement of the icons 51 (i.e., a moving amount of the icons 51) is calculated based on an amount of movement of the detected input object in the moving operation. Specifically, when the drag operation is performed, the amount of scrolling is calculated based on a moving amount of the input object in the drag operation. When the flick operation is performed, on the other hand, the amount of scrolling is calculated based on acceleration of the input object flicked in the flick operation.

In this MFP 10, in the case where the icons 51 are scrolled in the right direction, when a leftmost icon 51b of the icons 51 arranged in the right and left direction reaches the designated position located just below the mark 61, the icon 51b cannot be scrolled further in the right direction. The icon 51b displayed on a left end portion of the LCD 16 in FIG. 2A is an icon which has the first ordinal number in the arrangement order of the icons 51. When the icons 51 are scrolled in the right direction, this icon 51b is displayed at the designated position just below the mark 61 but not displayed at the right of the designated position. In other words, when the icons 51 are scrolled in the right direction, a right end of an area (hereinafter may be referred to as "displayable area") on the LCD 16 on which the first icon 51b can be displayed is located on an area (as one example a designated area) on which the icon 51b located at the designated position is displayed. Accordingly, even if the moving operation (i.e., the drag operation or the flick operation) in the right direction is performed in the state of the screen illustrated in FIG. 2A, and the amount of scrolling caused by the moving operation exceeds a distance X (as one example of a first moving amount) between (i) a position where the leftmost icon 51 (51b) is at rest before scrolling and (ii) the designated position just below the mark 61, for example, the leftmost icon 51b remains at the designated position and is not scrolled further in the right direction. Likewise, though not shown, even if the moving operation in the left direction is performed, and the amount of scrolling caused by the moving operation exceeds a distance (as one example of a second moving amount) between (i) a position where the rightmost icon 51 (i.e., an icon 51 having the last ordinal number in the arrangement order of the icons 51) is at rest before scrolling and (ii) the designated position, the rightmost icon 51b remains at the designated position and is not scrolled further in the left direction. It is noted that the first icon 51b is being displayed on the LCD 16 in the example in FIG. 2A, but even when the first icon 51b is not being displayed on the LCD 16, the distance X required for the icon 51b to reach the designated position can be obtained based on the ordinal number of the first icon 51b and the ordinal number of the icon 51 currently located at the designated position.

Figure 2C:
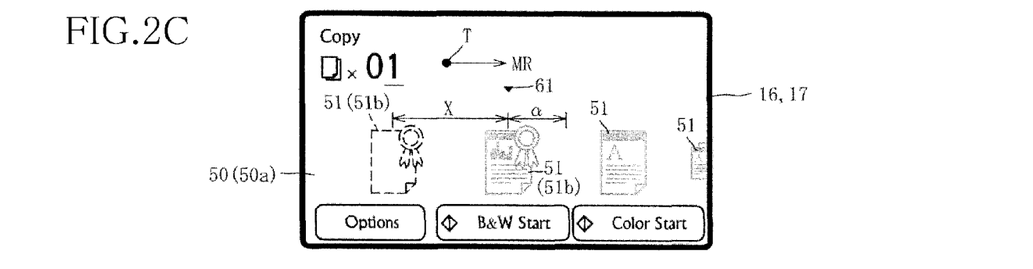

When the amount of scrolling caused by the moving operation is larger than a distance required for the leftmost or rightmost icon 51 to move from a position where the icon 51 is at rest before scrolling to the designated position, the MFP 10 as the present embodiment increases the transparency of the icons 51 being displayed on the setting screen 50. For example, when the amount of scrolling caused by the moving operation is not larger than the distance required for the leftmost or rightmost icon 51 to reach the designated position, as illustrated in FIG. 2B, the position of the icon 51 (51b) displayed after the scrolling is changed by the amount of scrolling, and the transparency of the icon 51 (51b) is not changed (that is, the display manner of the icon 51 (51b) is not changed). On the other hand, when the amount of scrolling caused by the moving operation is larger than the distance required for the leftmost or rightmost icon 51 to reach the designated position, as illustrated in FIG. 2C, the position of the icon 51 (51b) displayed after the scrolling is changed to the designated position, and the transparency of the icon 51 (51b) is changed (that is, the display manner of the icon 51 (51b) is changed). Here, the transparency is a degree of the transparency of each image. That is, when the user views the icons 51 having relatively high transparency, the user recognizes that the icons 51 are relatively light or faint. Accordingly, as illustrated in FIG. 2C, when the amount of scrolling caused by the moving operation is larger than the distance X as a scrollable amount, for example, the user recognizes that the icons 51 being displayed on the setting screen 50 are lighter or fainter than those before scrolling. By recognizing changes in the transparency of the displayed icons 51, the user can visually recognize that the icons 51 cannot scroll further in the right or the left direction. In this configuration, though the icons 51 had been scrolled by a distance smaller than that expected by the user based on the moving operation, the change in the transparency of the icons 51 allows the user to recognize that the scrolling by the smaller distance is caused not by a failure of the moving operation but by the state in which the amount of scrolling to be caused by the moving operation is larger than the scrollable amount. This configuration improves the operability of the user interface (e.g., the setting screen 50) configured such that the icons 51 can be scrolled.

When the amount of scrolling caused by the moving operation is larger than the scrollable amount (i.e., the distance X in FIG. 2C), the MFP 10 increases the transparency of the icons 51 with increase in excess amount (i.e., a distance a in FIG. 2C) that is obtained by subtracting the scrollable amount from the amount of scrolling caused by the moving operation. That is, when the drag operation or the flick operation is performed by a distance longer than the scrollable amount, the user recognizes that the icons 51 being displayed fade out more with increase in distance of the operation. Since the fade-out of the icons 51 allows the user to visually recognize that the icons 51 cannot be moved further from a certain position, the user can easily recognize that the rightmost or leftmost icon 51 reaches the designated position. However, even when the amount of scrolling caused by the moving operation is larger than the scrollable amount, the MFP 10 sets the transparency of the icons 51 to a value smaller than 100% at which the images are completely transparent, for example, the MFP 10 sets the transparency of the icons 51 to 50%. In this configuration, the input of the moving operation does not establish a state in which the icons 51 are not viewable, preventing the user from being confused due to a situation in which the user cannot visually recognize the icons 51.

Figure 2D:
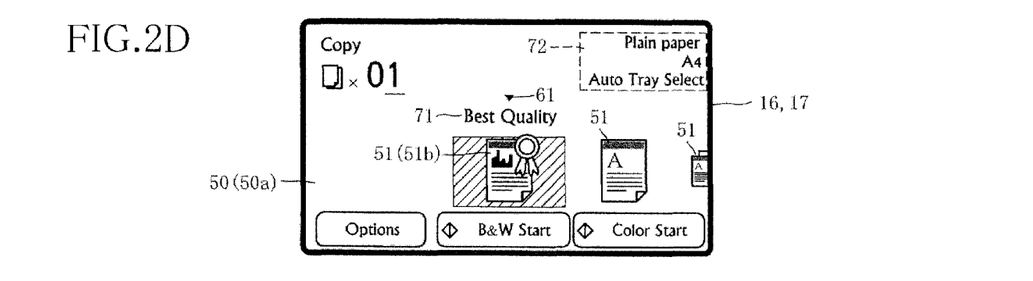

When the amount of scrolling caused by the moving operation is larger than the scrollable amount, the MFP 10 as described above increases the transparency of the icons 51 (see FIG. 2C) but as illustrated in FIG. 2D then returns the transparency of the icons 51 to an original value at a specific timing. That is, after increasing the transparency of the icons 51, the MFP 10 at the specific timing returns the transparency of the icons 51 to transparency set before a command for moving the icons 51 (hereinafter may be referred to as "moving command") is received, i.e., before scrolling. In this configuration, temporary change of the transparency of the icons 51 allows the user to easily and strongly recognize that the rightmost or leftmost icon 51 reaches the designated position. In the case where the moving operation is the drag operation, the specific timing at which the increased transparency is returned to the original value is a timing at which the input object located on or near the touch panel 17 is released or moved away, and thereby the touch panel 17 ceases detecting the input object. In the case where the moving operation is the flick operation, on the other hand, the specific timing is a timing a predetermined length of time after the end of the flick operation. The predetermined length of time is determined, for example, according to acceleration of the input object flicked in the flick operation. In this case, the predetermined length of time may be a time determined according to a difference between the scrollable amount and the amount of scrolling determined according to the acceleration and may be a time determined based on a function that depends upon the acceleration. Alternatively, the predetermined length of time may be a fixed length of time which is determined independently of the acceleration of the input object.

Also, the transparency of the icons 51 is returned to the original value, and at the same time an icon 51 located at the designated position located just below the mark 61 becomes the selected icon 51. Accordingly, the icon name 71 and the set values for the selected icon 51, i.e., the icon 51b in the example illustrated in FIG. 2D are respectively displayed again on an area just above the selected icon 51 and the display region 72. As described above, even when the amount of scrolling caused by the moving operation is larger than the scrollable amount, and the MFP 10 increases the transparency of the icons 51, display of the setting screen 50 which includes the transparency of the icons 51 is thereafter returned at the specific timing to the state established before the input of the moving command. Accordingly, the user can operate the setting screen 50 in the same manner as before the input of the moving command, resulting in good operability of the setting screen 50 as the user interface.

Figure 3A:
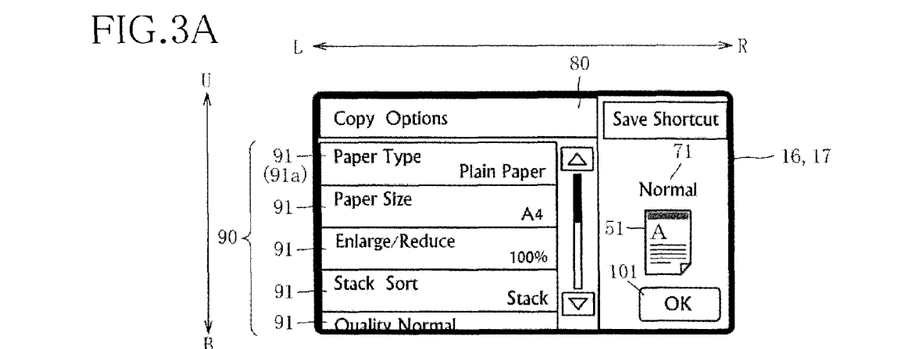
FIGS. 3A-3C are schematic views each illustrating one example of a display manner of a setting screen.
Figure 3B:
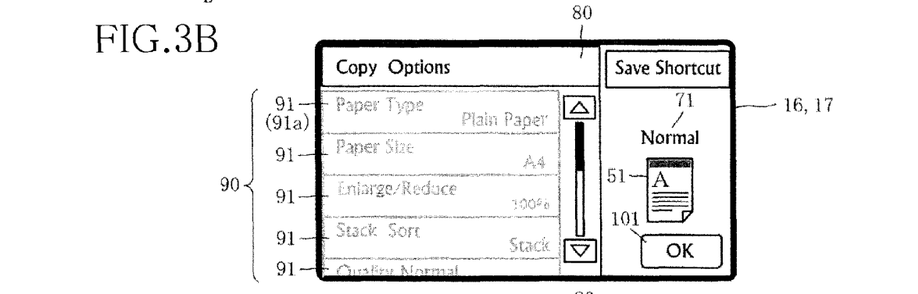
Figure 3C:
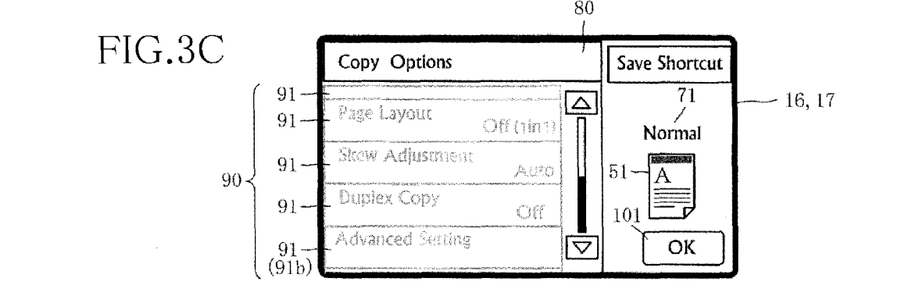

FIGS. 3A-3C illustrate one example of the setting screen 80 for individually setting the set values associated with the selected icon 51. The setting screen 80 illustrated in FIGS. 3A-3C is displayed when a touch operation is performed on the option button 64 displayed on the copy setting screen 50a illustrated in FIG. 2A. As illustrated in FIG. 3A, on a right portion of the setting screen 80 is displayed an icon 51 corresponding to the setting screen 80, i.e., an icon 51 being selected when the option button 64 is operated. An icon name 71 corresponding to the icon 51 is displayed just above the displayed icon 51.

An item list 90 for each set value is displayed on a left portion of the setting screen 80. The item list 90 is constituted by a plurality of item images 91 arranged in the up and down direction indicated by arrow UB and respectively corresponding to the set values. With each of the item images 91 is associated a corresponding one of the set values stored as the set value data 12b. When a touch operation is performed on one of the item images 91 being displayed, a screen for changing the set value corresponding to the operated item image 91 is displayed. Accordingly, the user can touch the item image 91 corresponding to the set value to be changed and change the set value on the displayed screen to change the set value corresponding to the touched item image 91. When a touch operation is performed on an OK button 101, the changed set value is reflected in the set value corresponding to the icon 51 displayed on the right portion of the setting screen 80.

As in the case of the icons 51 displayed on the above-described setting screen 50, the plurality of item images 91 constituting the item list 90 are displayed also in a predetermined arrangement order. When the touch panel 17 has detected a moving operation (i.e., a drag operation or a flick operation) in a direction in which the item images 91 are arranged (in the up direction or the down direction), the item images 91 arranged in a row in the up and down direction are scrolled in a direction of the operating direction without changing the arrangement order of the item images 91. The amount of this scrolling is calculated based on the amount of movement of the detected input object in the moving operation as in the case of the above-described icons 51. It is noted that since the icon 51 displayed on the setting screen 80 is an icon 51 being selected on the setting screen 50, the icon name 71 is kept displayed without disappearing during scrolling of the item images 91.

In a case where the total number of the item images 91 constituting the item list 90 is larger than the number of the item images 91 displayable on the LCD 16 so as to be arranged in the up and down direction, item images 91 not fitting on the LCD 16 among all the item images 91 are not displayed on the LCD 16. Accordingly, as in the case of the above-described icons 51, by scrolling the item images 91 arranged in the up and down direction as needed, one or ones of the item images 91 not being displayed can be displayed on the setting screen 80. In this MFP 10, in the case where the item images 91 are scrolled in the down direction, as illustrated in FIG. 3A, when an uppermost item image 91 (91*a*) of the item images 91 constituting the item list 90 is located at an upper end portion of a display region on which the item list 90 is displayed, the item images 91 cannot be scrolled further in the down direction indicated by arrow B. The item image 91 displayed on the upper end portion of the display region on which the item list 90 is displayed in FIG. 3A is an item image 91*a* which has the first ordinal number in the arrangement order of the item images 91. When the item images 91 are scrolled in the down direction, this item image 91*a* is displayed at the upper end portion (i.e., the designated position) of the display region on which the item list 90 is displayed, but not displayed on a lower side of the designated position. In other words, when the item images 91 are scrolled in the down direction, an upper end of an area (hereinafter may be referred to as "displayable area") of the LCD 16 on which the first item image 91*a* can be displayed is located on an area (as one example of the designated area) on which the item image 91*a* located at the designated position is displayed. In this MFP 10, likewise, when the item images 91 are scrolled in the up direction, and a lowermost item image 91*b* (i.e., an item image 91 having the last ordinal number in the arrangement order of the item images 91) among the item images 91 constituting the item list 90 is located at a lower end portion of the display region on which the item list 90 is displayed, the item images 91 cannot be scrolled further in the up direction indicated by arrow U.

As in the case of the above-described icons 51, when the amount of scrolling caused by the moving operation is larger than the scrollable amount, the MFP 10 as the present embodiment increases the transparency of the item images 91 being displayed. For example, when the amount of scrolling caused by the moving operation is not larger than the scrollable amount, the positions of the item images 91 displayed after the scrolling are changed by the amount of scrolling, and the transparency of the item images 91 is not changed (that is, the display manner of the item images 91 is not changed). On the other hand, when the amount of scrolling caused by the moving operation is larger than the scrollable amount, as illustrated in FIG. 3B, the position of the item image 91 (91*a*) displayed after the scrolling is changed to the designated position, and the transparency of the item images 91 is changed (that is, the display manner of the item images 91 is changed). In the example in FIG. 3A, the uppermost item image 91*a* is displayed on an upper end portion of the display region. Thus, when the moving operation is performed in the down direction in this state, the MFP 10 increases the transparency of the item images 91 as illustrated in FIG. 3B without scrolling the item images 91 from the state illustrated in FIG. 3A. Likewise, as illustrated in FIG. 3C, when the moving operation is performed in the up direction indicated by arrow U in a state in which the lowermost item image 91*b* is located at the lower end portion of the display region, the MFP 10 increases the transparency without scrolling the item images 91. As in the case of the setting screen 50, this configuration improves the operability of the setting screen 80 as the user interface on which the item list 90 (i.e., the item images 91) can be scrolled.

In the case of the item images 91, as in the case of the above-described icons 51, when the amount of scrolling caused by the moving operation is larger than the scrollable amount, the MFP 10 increases the transparency of the item images 91 with increase in excess amount. As in the case of the above-described icons 51, the MFP 10 returns the increased transparency of the item images 91 to an original value at a specific timing.

Figure 4:
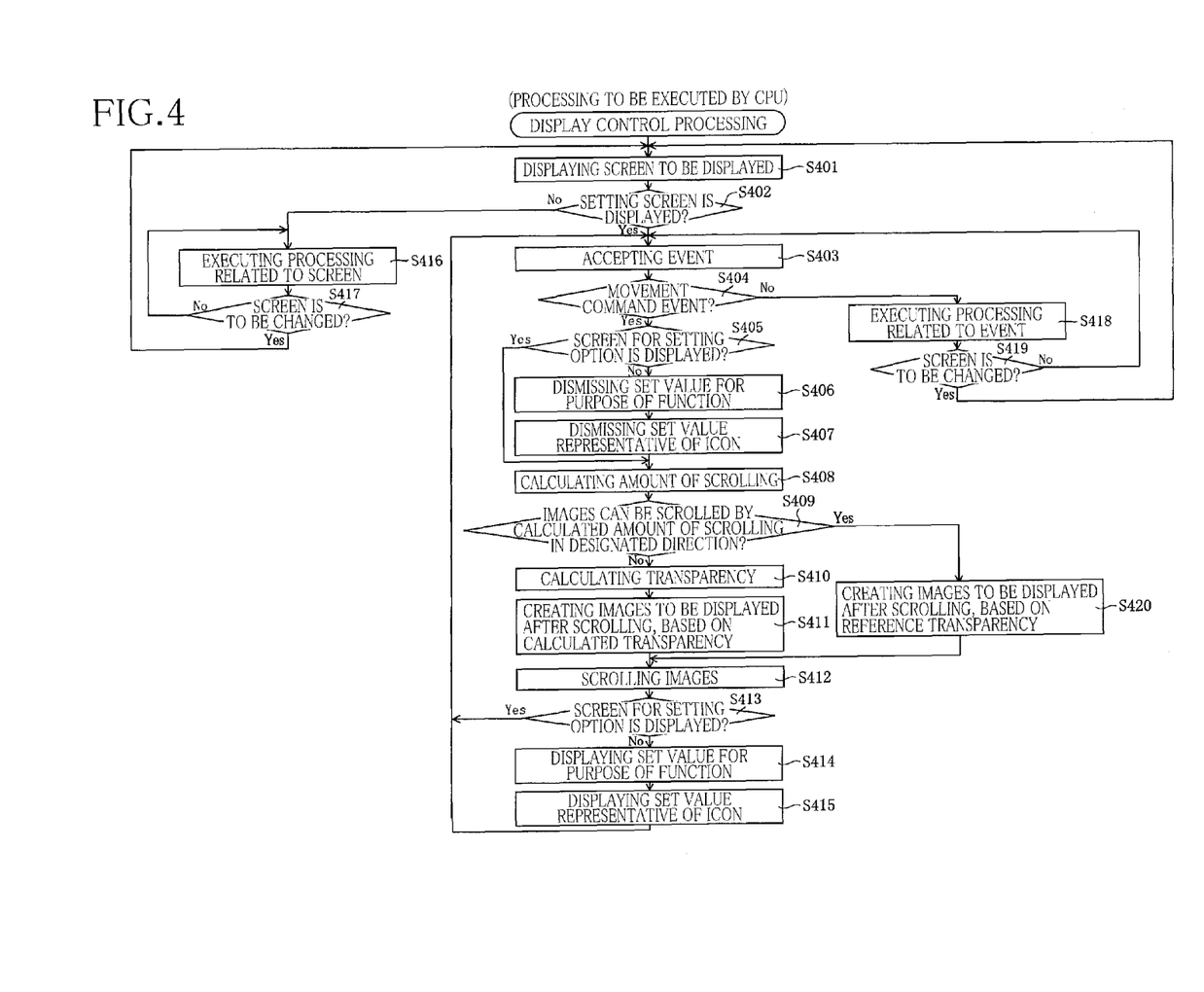
FIG. 4 is a flow chart illustrating a display control processing.

FIG. 4 is a flow chart illustrating a display control processing. This processing is a processing executable by the CPU 11 according to the control program 12*a* to control the LCD 16 to display various screens such as the setting screen 50 and the setting screen 80. This flow begins when the MFP 10 is turned on. At Step S401 (hereinafter "Step" is omitted where appropriate), the CPU 11 displays a screen to be displayed now. When the screen to be displayed at S401 is a screen on which a plurality of scrollable images arranged in the predetermined direction can be displayed, a first one of the plurality of images in the arrangement order is displayed at a predetermined position on the screen.

When the screen displayed is not the setting screen 50 or the setting screen 80 (S402: No), the CPU 11 at S416 executes a processing related to the screen being displayed, e.g., a processing related to a received event. When the processing executed at S416 is not a change of screen (S417: No), the CPU 11 at S416 continues executing the processing related to the screen being displayed. On the other hand, when the processing executed at S416 is a change of screen (S417: Yes), this flow goes to S401 at which the CPU 11 displays the changed screen as the screen to be displayed.

On the other hand, when the screen displayed is the setting screen 50 or the setting screen 80 (S402: Yes), the CPU 11 at S403 executes a processing for accepting an event. The CPU 11 at S404 determines whether the accepted event is a movement command event or not. The movement command event is an event caused by the moving operation (i.e., the drag operation or the flick operation). The CPU 11 accepts the movement command event in response to the drag operation or the flick operation performed on the touch panel 17.

When the CPU 11 has accepted an event that differs from the movement command event, e.g., an operating event caused in response to an operation of any of the buttons 62-64 displayed on the setting screen 50 (S404: No), the CPU 11 at S418 executes a processing related to a received event. When the processing executed at S418 is not a change of screen (S418: No), the CPU 11 at S403 continues executing the processing for accepting an event. On the other hand, when the processing executed at S418 is a change of screen (S418: Yes), this flow goes to S401 at which the CPU 11 displays the changed screen as the screen to be displayed.

When the CPU 11 has accepted the movement command event, i.e., an event caused by the drag operation or the flick operation (S404: Yes), the CPU 11 at S405 determines whether the setting screen being displayed is a screen for setting an option or not. When the setting screen being displayed is not a screen for setting an option, that is, the setting screen being displayed is the setting screen 50 (S405: No), the CPU 11 at S406 dismisses set values for a purpose of a function. As a result, the set values being displayed on the display region 72 disappear. The CPU 11 at S407 dismisses a set value representative of an icon, and this flow goes to S408. As a result of the processing at S407, the icon name 71 being displayed disappears. On the other hand, when the setting screen being displayed is a screen for setting an option (i.e., the setting screen 80) (S404: No), this flow goes to S408.

At S408, the CPU 11 calculates an amount of scrolling of images such as the icons 51 and the item images 91, based on an amount of movement of a detected input object in the moving operation (i.e., the drag operation or the flick operation) which causes the CPU 11 to accept the movement command event. As described above, when the moving operation is the drag operation, the CPU 11 calculates the amount of scrolling based on the moving amount of the input object, and when the moving operation is the flick operation, the CPU 11 calculates the amount of scrolling based on the acceleration of the flicked input object. Then, the CPU 11 at S409 determines whether images can be scrolled by the calculated amount of scrolling in a designated direction or not. Specifically, when the calculated amount of scrolling is equal to or smaller than a scrollable amount that is a maximum amount by which the images can be scrolled in the operating direction of the moving operation, the CPU 11 determines that the images can be scrolled. On the other hand, when the calculated amount of scrolling is larger than the scrollable amount by which the images can be scrolled in the operating direction of the moving operation, the CPU 11 determines that the images cannot be scrolled.

When the CPU 11 determines that the images cannot be scrolled (S409: No), the CPU 11 at S410 calculates the transparency of images based on a difference between the calculated amount of scrolling and the scrollable amount by which the images can be scrolled in the operating direction of the moving operation, i.e., based on an excess amount of the calculated amount of scrolling with respect to the scrollable amount. In the present embodiment, the CPU 11 at S410 calculates the transparency based on the difference, using a function in which the value of the transparency increases with increase in the difference, taking a predetermined transparency which does not cause the images to be inviewable, as a maximum value. Then, the CPU 11 at S411 creates images to be displayed after scrolling, based on the calculated transparency, and this flow goes to S412.

On the other hand, when the CPU 11 at S409 determines that the images can be scrolled (S409: Yes), the CPU 11 at S420 creates images to be displayed after scrolling such that the images have reference transparency, and this flow goes to S412. It is noted that the reference transparency is the lowest transparency among transparencies which can be applied to the images (i.e., the icons 51 and the item images 91) to be displayed on the setting screens 50, 80.

The CPU 11 at S412 executes a processing for scrolling images. Specifically, the CPU 11 at S412 scrolls the images (i.e., the icons 51 or the item images 91) displayed on the setting screen before the movement command event is accepted (that is, before the movement command is input), to a position based on the amount of scrolling calculated at S408, at a predetermined scrolling speed in the operating direction of the moving operation which causes the CPU 11 to accept the movement command event, and the CPU 11 then stops scrolling the images. It is noted that, when the CPU 11 at S409 determines that the images can be scrolled, a distance by which the images are actually scrolled at S412 is equal to the calculated amount of scrolling, and when the CPU 11 at S409 determines that the images cannot be scrolled, the distance by which the images are actually scrolled at S412 is equal to a distance required for the image to reach the designated position.

After the processing at S412, when the setting screen being displayed is the setting screen 50 (S413: No), the CPU 11 at S414 and S415 displays set values for the purpose of a function corresponding to the icon 51 located at the designated position, and a set value representative of the icon, and this flow goes to S403. As a result of these processings at S414 and S415, the set values corresponding to the icon 51 being selected are displayed on the display region 72, and the icon name 71 corresponding to the icon 51 is displayed just above the icon 51. On the other hand, when the setting screen being displayed is the setting screen 80 (S413: Yes), this flow goes to S403.

In the present embodiment, when the amount of scrolling caused by the moving operation is larger than the scrollable amount, the MFP 10 increases the transparency of the images during and after scrolling, on the screen such as the setting screens 50, 80 on which the images (i.e., the icons 51 or the item images 91) arranged in the predetermined direction can be scrolled. Accordingly, the change in the transparency of the images allows the user to visually recognize that the images cannot be scrolled further, resulting in improvement of operability of the screen as the user interface.

In the above-described embodiment, the MFP 10 is one example of a display apparatus. The LCD 16 is one example of a display device. The CPU 11 is one example of a controller. The flash memory 12 is one example of a storage. Each of the scanner 18 and the printer 19 is one example of a function executing device. Each of the icons 51 and the item images 91 is one example of an image. Each of the icon 51b and the item image 91a is one example of a first ordinal number image whose ordinal number is first in the arrangement order among the plurality of images. The item image 91b is one example of a last ordinal number image whose ordinal number is the last in the arrangement order among the plurality of images. The set value data 12b is one example of first setting data. The icon name data 12c is one example of second setting data. The CPU 11 which executes the processings at S401 and S412 is one example of an image display device. The CPU 11 which executes the processing at S404 is one example of a determining device. The CPU 11 which executes the processing at S408 is one example of a moving amount calculating device. The CPU 11 which executes the processing at S412 is one example of an image updating device. The CPU 11 which executes the processing at S411 is one example of a manner control device.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, while the MFP 10 is one example of the display apparatus according to the present invention in the above-described embodiment, the present invention is not limited to this configuration. That is, various devices can be employed as the display apparatus according to the present invention as long as the devices can display the screen on which the images arranged in the predetermined direction can be scrolled in response to the operation performed for the touch panel. Examples of the various devices include: a device having only one function such as a printer and a scanner; a mobile device such as a smartphone and a mobile phone; a tablet device; a personal computer; a digital camera; and a music player.

In the above-described embodiment, the display apparatus according to the present invention is the MFP 10 integrally including the display device capable of displaying the screen on which the images arranged in the predetermined direction can be scrolled in response to the operation performed on the touch panel. However, a device which includes housings provided separately from each other and respectively constituting a portion of the display device capable of displaying the screen and a portion of a controller for controlling the display device may be employed as the display apparatus according to the present invention.

While the setting screen for the copying function is used as a screen according to the present invention in the above-described embodiment, any screen may be used as long as the screen is a screen on which the images arranged in the predetermined direction can be scrolled. For example, the present invention is not limited to the setting screen for the function executable by the apparatus such as the setting screens 50, 90 used in the above-described embodiment, and the present invention is also applicable to a screen for displaying a list of a plurality of images such that the images can be scrolled. While the images arranged in a row in the right and left direction or the up and down direction are scrolled in the above-described embodiment, the present invention is also applicable to a configuration in which images arranged in a plurality of rows in the right and left direction or the up and down direction are scrolled.

In the above-described embodiment, the icons 51 and the item images 91 to be scrolled are images corresponding to the set value data 12b stored in the flash memory 12 provided in the MFP 10. However, the images to be scrolled may be images corresponding to set value data stored in a storage medium such as a memory card.

When the amount of scrolling caused by the moving operation is larger than the scrollable amount, the MFP 10 increases the transparency of the images after scrolling in the above-described embodiment but may change another display manner of the images which is different from the transparency such as a color of the images, a background color of the image, and the size of each image.

When the amount of scrolling caused by the moving operation is larger than the scrollable amount, the MFP 10 increases the transparency of the images with increase in excess amount in the above-described embodiment but may determine the transparency of the images at transparency that is higher than the reference transparency by a fixed amount regardless of the excess amount.

When the amount of scrolling caused by the moving operation is larger than the scrollable amount, the MFP 10 uniformly increases the transparency of the images being displayed on the screen in the above-described embodiment but may, in a case where a plurality of images are being displayed on the screen, increase the transparency of each image sequentially from one to the other side of the plurality of images. For example, the MFP 10 may be configured such that the transparency of the image located at one end of the images is determined at the lowest transparency among the images, and the transparency of the images increases in order from the one end. It is noted that in the case where the MFP 10 changes another display manner instead of the transparency, the display manner may change in order from one to the other side of the plurality of images.

When the amount of scrolling caused by the moving operation is larger than the scrollable amount, the MFP 10 increases the transparency of the images such that the images are not inviewable in the above-described embodiment, but may determine the transparency of the images to a value that makes the images inviewable.

In the above-described embodiment, when the amount of scrolling caused by the moving operation is larger than the scrollable amount, the MFP 10 increases the transparency of the images after scrolling but may decrease the transparency of the images after scrolling.

In the above-described embodiment, when the transparency of the images are increased, the increased transparency is automatically returned to the original value at the specific timing after the drag operation or the flick operation. However, the MFP 10 may be configured such that the increased transparency is not automatically returned to the original value and is returned to the original value when the user touches the screen, for example.

While the CPU 11 executes each processing in FIG. 4 in the above-described embodiment and the modifications, each processing in FIG. 4 may be executed by a plurality of CPUs in combination. Also, each processing in FIG. 4 may be executed by a single or a plurality of ICs such as ASICs. Also, each processing in FIG. 4 may be executed by the CPU(s) 11 and the IC(s) such as ASIC(s) in combination.

What is claimed is:

1. A display apparatus comprising:
a display device;
a touch panel superposed on the display device and configured to detect a touch operation of an input object in a state in which the touch panel is touched or approached by the input object;
a storage configured to store a plurality of sets of data respectively representative of a plurality of images; and
a controller configured to control the display device to display at least two images of the plurality of images in a state in which the at least two images are arranged in a first direction in an arrangement order and a second direction being opposed to the first direction,
wherein the display device comprises a plurality of display positions, on each of which at least one of the at least two images is displayable,
wherein the plurality of display positions comprise a designated display position, a designated image being an image positioned at the designated display position,
wherein the plurality of images comprise a first-side end image and a second-side end image in the arrangement order,
wherein the first-side end image is to be displayed last on the display device among the plurality of images when the plurality of images are moved in the first direction in a state in which the first-side end image is not displayed on the display device while the second-side end image is to be displayed last on the display device among the plurality of images when the plurality of images are moved in the second direction in a state in which the second-side end image is not displayed on the display device, and
wherein the controller is configured to:
calculate a moving distance based on a moving operation when the moving operation is received by the touch panel, the moving operation being an operation for moving the at least two images in one of the first direction and the second direction, the moving distance being a distance of movement of the plurality of images;

compare the calculated moving distance with a first-end distance when the plurality of images are moved in the first direction;

compare the calculated moving distance with a second-end distance when the plurality of images are moved in the second direction, the first-end distance being a distance between the designated image positioned at the designated display position and the first-side end image, the second-end distance being a distance between the designated image positioned at the designated display position and the second-side end image;

move the at least two images arranged in the arrangement order and displayed on the display device, by the calculated moving distance in a first display manner in the first direction, when the calculated moving distance is less than or equal to the first-end distance;

move the at least two images arranged in the arrangement order and displayed on the display device, by the calculated moving distance in the first display manner in the second direction, when the calculated moving distance is less than or equal to the second-end distance;

change a display manner of the at least two images arranged in the arrangement order to a second display manner different from the first display manner and display the at least two images arranged in the arrangement order in the second display manner, when the calculated moving distance is greater than the first-end distance; and change the display manner of the at least two images arranged in the arrangement order to the second display manner and display the at least two images arranged in the arrangement order in the second display manner, when the calculated moving distance is greater than the second-end distance.

2. The display apparatus according to claim 1,
wherein a plurality of ordinal numbers are sequentially assigned to the plurality of images which are moved according to a moving operation for moving the at least two images in the first direction, and the plurality of images comprise a first ordinal number image, as the first-side end image, whose ordinal number is first in the arrangement order,
wherein the display device comprises a display region on which the first ordinal number image is displayable, and the display region comprises a designated area, as the designated display position,
wherein the controller is capable of displaying the first ordinal number image on the designated area when having received the moving operation for moving the at least two images in the first direction, and
wherein the controller is configured to:
    compare, when the moving operation for moving the at least two images in the first direction is received by the touch panel, the calculated moving distance with the first-end distance by which the at least two images arranged in the arrangement order need to be moved to display the first ordinal number image on the designated area; and
    determine that the at least two images arranged in the arrangement order are not movable by the calculated moving distance, when the calculated moving distance is greater than the first-end distance.

3. The display apparatus according to claim 2, wherein the controller is configured to display the first ordinal number image on the designated area in the second display manner when the calculated moving distance is greater than the first-end distance.

4. The display apparatus according to claim 2, wherein the designated area is located at a center of the display device in the first direction.

5. The display apparatus according to claim 1,
wherein a plurality of ordinal numbers are sequentially assigned to the plurality of images which are moved according to a moving operation for moving the at least two images in the second direction, and the plurality of images comprise a last ordinal number image, as the second-side end image, whose ordinal number is the last in the arrangement order,
wherein the display device comprises a display region on which the last ordinal number image is displayable, and the display region comprises a designated area, as the designated position,
wherein the controller is capable of displaying the last ordinal number image on the designated area when having received the moving operation for moving the at least two images in the second direction, and
wherein the controller is configured to:
    compare, when the moving operation for moving the at least two images in the second direction is received by the touch panel, the calculated moving distance with the second-end distance by which the at least two images arranged in the arrangement order need to be moved to display the last ordinal number image on the designated area; and
    determine that the at least two images arranged in the arrangement order are not movable by the calculated moving distance, when the calculated moving distance is greater than the second-end distance.

6. The display apparatus according to claim 1,
wherein a plurality of ordinal numbers are sequentially assigned to the plurality of images which are moved according to a moving operation for moving the at least two images in the first direction, and the plurality of images comprise a first ordinal number image, as the first-side end image, whose ordinal number is first in the arrangement order,
wherein the display device comprises a display region on which a plurality of images that are moved according to the moving operation are displayable, and the display region comprises a designated area, as the designated position, which is an end portion of the display region in the second direction,
wherein the controller is capable of displaying the first ordinal number image on the designated area when having received the moving operation for moving the at least two images in the first direction, and
wherein the controller is configured to:
    compare, when the moving operation for moving the at least two images in the first direction is received by the touch panel, the calculated moving distance with the first-end distance by which the at least two images arranged in the arrangement order need to be moved to display the first ordinal number image on the designated area; and
    determine that the at least two images arranged in the arrangement order are not movable by the calculated moving distance, when the calculated moving distance is greater than the first-end distance.

7. The display apparatus according to claim 1,
wherein a plurality of ordinal numbers are sequentially assigned to the plurality of images which are moved according to a moving operation for moving the at least two images in the second direction, and the plurality of images comprise a last ordinal number image, as the second-side end image, whose ordinal number is the last in the arrangement order, wherein the display device comprises a display region on which a plurality of images that are moved according to the moving operation are displayable, and the display region comprises a designated area, as the designated position, which is an end portion of the display region in the first direction, wherein the controller is capable of displaying the last ordinal number image on the designated area when having received the moving operation for moving the at least two images in the second direction, and wherein the controller is configured to:
compare, when the moving operation for moving the at least two images in the second direction is received by the touch panel, the calculated moving distance with the second-end distance by which the at least two images arranged in the arrangement order need to be moved to display the last ordinal number image on the designated area; and determine that the at least two images arranged in the arrangement order are not movable by the calculated moving distance, when the calculated moving distance is greater than the second-end distance.

8. The display apparatus according to claim 1, wherein the controller is configured to increase transparency of the at least two images arranged in the arrangement order after the at least two images are moved, when the at least two images arranged in the arrangement order are not movable in the moving direction by the calculated moving distance.

9. The display apparatus according to claim 8, wherein the controller is configured to increase the transparency such that the at least two images arranged in the arrangement order after the movement thereof are not completely transparent.

10. The display apparatus according to claim 8, wherein the controller is configured to increase the transparency of the at least two images arranged in the arrangement order, with increase in difference between the calculated moving distance and the first-end distance, when the at least two images arranged in the arrangement order are not movable in the moving direction by the calculated moving distance.

11. The display apparatus according to claim 1, wherein the controller is configured to:
when the at least two images arranged in the arrangement order are not movable in the first direction by the calculated moving distance,
display the at least two images arranged in the arrangement order in the second display manner for a predetermined period of time;
change the display manner of the at least two images arranged in the arrangement order to an original display manner when the predetermined period of time ends;
display the at least two images arranged in the arrangement order in the original display manner;
when the at least two images arranged in the arrangement order are not movable in the second direction by the calculated moving distance,
display the at least two images arranged in the arrangement order in the second display manner for the predetermined period of time;
change the display manner of the at least two images arranged in the arrangement order to the original display manner when the predetermined period of time ends; and
display the at least two images arranged in the arrangement order in the original manner.

12. The display apparatus according to claim 1, further comprising a function executing device configured to execute a preset function,
wherein each of the plurality of images is associated with at least one of (i) first setting data constituted by at least one set value which is used when the preset function is executed by the function executing device and (ii) second setting data associated with the first setting data, and wherein the controller is configured to:
control the display device to display the at least two images of the plurality of images and display at least one of (a) at least one of the at least one set value represented by the first setting data corresponding to one image of the at least two images arranged in the arrangement order and displayed on the display device and (b) a set value represented by the second setting data corresponding to the one image; and
control the display device not to display at least one of (c) the at least one of the at least one set value represented by the first setting data and (d) the set value represented by the second setting data throughout a period in which the at least two images arranged in the arrangement order are moved in the second display manner based on the moving operation.

13. The display apparatus according to claim 12, wherein the controller is configured to:
control the display device to display the at least two images of the plurality of images and display at least one set value which is used when the preset function is executed by the function executing device and which is shared by the plurality of images; and
control the display device to continue displaying the at least one set value shared by the plurality of images throughout the period in which the at least two images arranged in the arrangement order are moved in the second display manner based on the moving operation.

14. The display apparatus according to claim 12, wherein the controller is configured to control the display device not to display the set value represented by the second data, in a state in which the one image corresponding to the second setting data is located on the designated display position and displayed in the first display manner, during movement of the at least two images.

15. The display apparatus according to claim 1,
wherein the display device comprises a plurality of display areas, on each of which one of the plurality of images is displayable, and the plurality of display areas comprises a first display area,
wherein the controller is configured to control the display device to display a set value assigned to one of the at least two images which is being displayed on the first display area, and
wherein the controller is configured to control the display device not to display the set value during display of the at least two images in the second display manner.

16. The display apparatus according to claim 15,
wherein the display device comprises a plurality of display areas, on each of which one of the plurality of images is displayable, and the plurality of display areas comprises a first display area as the designated display position, wherein the plurality of display areas comprise: a second display area located on a first-direction side of the first display area in the first direction; and a third display area located on a second-direction side of the first display area in the second direction, and one of the plurality of images is displayable on each of the second display area and the third display area, wherein the plurality of images comprise a first ordinal number image, as the first-side end image, located farthest in the second direction from a center of the plurality of images in the second direction among the plurality of images, wherein the controller is configured to determine whether the first ordinal number image is moved, by a moving operation for moving the at least two images in the first direction, to a position located farther from the third display area than from the first display area, wherein the controller is configured to move the at least two images on the display device in the second display manner when the controller determines that the first ordinal number image is moved, by the moving operation for moving the at least two images in the first direction, to the position located farther from the third display area than from the first display area.

17. The display apparatus according to claim 1, wherein the controller is configured to, when the calculated moving distance is greater than the first-end distance, change the display manner of the at least two images to the second display manner after the first-side end image has reached the designated display position.

18. A non-transitory storage medium storing instructions executable by a computer of a display apparatus, the display apparatus comprising:

a display device; and a touch panel superposed on the display device and configured to detect a touch operation of an input object in a state in which the touch panel is touched or approached by the input object, the instructions, when executed, causing the computer to:

control the display device to display at least two images of a plurality of images respectively based on a plurality of sets of data stored in a storage, in a state in which the at least two images are arranged in a first direction in an arrangement order and a second direction being opposed to the first direction, wherein the display device comprises a plurality of display positions, on each of which at least one of the at least two images is displayable, wherein the plurality of display positions comprise a designated display position, a designated image being an image positioned at the designated display position, wherein the plurality of images comprise a first-side end image and a second-side end image in the arrangement order, wherein the first-side end image is to be displayed last on the display device among the plurality of images when the plurality of images are moved in the second direction in a state in which the first-side end image is not displayed on the display device, while the second-side end image is to be displayed last on the display device among the plurality of images when the plurality of images are moved in the first direction in a state in which the second-side end image is not displayed on the display device, and wherein the instructions, when executed, cause the computer to:

calculate a moving distance based on a moving operation when the moving operation is received by the touch panel, the moving operation being an operation for moving the at least two images in one of the first direction and the second direction, the moving distance being a distance of movement of the plurality of images;

compare the calculated moving distance with a first-end distance when the plurality of images are moved in the first direction;

compare the calculated moving distance with a second-end distance when the plurality of images are moved in the second direction, the first-end distance being a distance between the designated image position at the designated display position and the first-side end image, the second-end distance being a distance between the designated image position at the designated display position and the second-side end image;

move the at least two images arranged in the arrangement order and displayed on the display device, by the calculated moving distance in a first display manner in the first direction, when the calculated moving distance is less than or equal to the first-end distance;

move the at least two images arranged in the arrangement order and displayed on the display device by the calculated moving distance in the first display manner in the second direction, when the calculated moving distance is less than or equal to the second-end distance;

change a display manner of the at least two images arranged in the arrangement order to a second display manner different from the first display manner and display the at least two images arranged in the arrangement order in the second display manner, when the calculated moving distance is greater than the first-end distance; and change the display manner of the at least two images arranged in the arrangement order in the second display manner, when the calculated moving distance is greater than the second-end distance.

* * * * *

UNITED STATES PATENT AND TRADEMARK OFFICE
CERTIFICATE OF CORRECTION

PATENT NO. : 9,965,167 B2
APPLICATION NO. : 14/176534
DATED : May 8, 2018
INVENTOR(S) : Sadaaki Miyazaki It is certified that error appears in the above-identified patent and that said Letters Patent is hereby corrected as shown below:

On the Title Page

Item (54) should read:
DISPLAY APPARATUS FOR DISPLAYING IMAGES IN DIFFERENT MANNERS AND NON-TRANSITORY STORAGE MEDIUM STORING INSTRUCTIONS EXECUTABLE BY THE DISPLAY APPARATUS In the Claims Column 18, Line 65, Claim 16 should read:
The display apparatus according to claim 1, Signed and Sealed this
Twenty-ninth Day of January, 2019

Andrei Iancu
*Director of the United States Patent and Trademark Office*